H. WIARD.

Plow.

No. 9,189. Reissued May 4, 1880.

Witnesses:

J. J. Grumagh

Lee W. Hall

Inventor:

Harry Wiard

N. PETERS, PHOTO-LITHOGRAPHER, WASHINGTON, D. C.

UNITED STATES PATENT OFFICE.

HARRY WIARD, OF SYRACUSE, NEW YORK.

PLOW.

SPECIFICATION forming part of Reissued Letters Patent No. 9,189, dated May 4, 1880.

Original No. 197,918, dated December 4, 1877. Application for reissue filed February 24, 1880.

DIVISION A.

*To all whom it may concern:*

Be it known that I, HARRY WIARD, of Syracuse, New York, have invented certain new and useful Improvements in Plows, of which the following is an amended description for the reissue of the original Letters Patent No. 197,918, dated December 4, 1877.

My inventions herein described consist of the following parts: the brace or cross-bar between the rear end of the mold-board and land-side, to which the handles are rigidly affixed, which, by its end attachments, is readily raised or lowered to elevate or depress the handles and hold them firmly in place, the end connections of the bar being so formed as to admit of ready adjustment to any deviation between its points of attachment to the rear end of the mold-board and land-side; the spreader, to which the lower ends of the handles are clamped, turning in bearings for adjusting it to the elevation of the handles; also, the clevis, so made as to be readily shifted to regulate the draft of the plow and be held in place by the draft upon it.

The following is a description of the improvements, referring to the accompanying drawings, in which—

Figure 1:
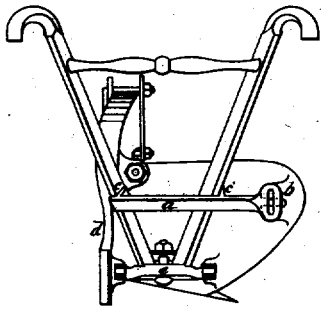
Figure 3:
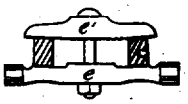
Figure 2:
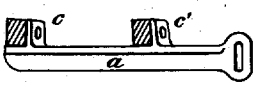
Figure 5:
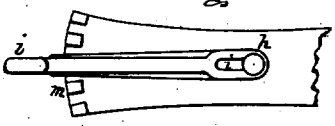

Figure 1 is a rear view of the plow, showing the cross-bar *a* and spreader *e* with the handles affixed; Fig. 2, an enlarged view of bar *a* detached; Fig. 3, similar view of the spreader *e;* Fig. 4, plan of the plow; Fig. 5, end of the beam, side elevation, with clevis in place.

The plow shown in the drawings represents an improved cast-iron plow and beam to which my improvements are attached, some or all of which can be used on other plows.

The cross-bar or brace *a*, Figs. 1 and 2, extends across from the land-side to the mold-board near its rear upper corner, at a proper height for the handles of the plow to rest on. It is attached to a lug, *b*, projecting from the inner surface of the mold-board by a screw-bolt running through a horizontal slot in lug *b*, (shown by dotted lines in Fig. 1,) and through a similar one at right angles to it in the end of bar *a*. On the upper side of bar *a* are two lugs, *c c'*, to which the plow-handles are bolted by horizontal screw-bolts. The bolt through lug *c* and the land-side handle extends through an oblong slot in the land-side handle at *d*, by means of which slots that end of the cross-bar *a* can be shifted to adjust the handles to the proper height. This construction and arrangement gives great strength and stability to the connections, with ease and simplicity in fitting the castings together.

The spreader *e*, near the junction of the mold-board and point, (seen detached, Fig. 3,) has cylindrical ends fitting into sockets on the inner face of the mold-board and land-side, forming a rocker, to which the lower ends of the plow-handles are affixed by a clamp, *e'*, united by a screw-bolt with rocker *e* at their center between the handles. (See Fig. 3.) As the cross-bar *a* is raised or lowered the spreader *e* turns in its sockets to adjust it to the inclination of the handles and prevents any undue strain upon the parts, thus reducing their liability to break.

The clevis *i* spans the end of the plow-beam, embracing its sides, (see Fig. 4,) and is attached by a screw-bolt, *h*, that passes horizontally through the slots in its rear end at *i'*, Fig. 5, and through the beam, whereby the clevis *i* is allowed to slide back to disengage it from projections or cogs *m* on the side of the beam, which the clevis at *l l* engages with when it is thrust forward, as seen in the drawings. The clevis is held at the desired elevation by the cogs *m*, the draft upon the clevis tending to hold it in place, even if the bolt *h* is not screwed tight. To change the elevation of the clevis the bolt *h* is loosened, but not removed, the clevis is pushed back and disengaged from cogs *m*, and then raised or lowered and again drawn forward into place between cogs *m*, when the bolt *h* may be again screwed tight to hold it securely.

Figure 4:
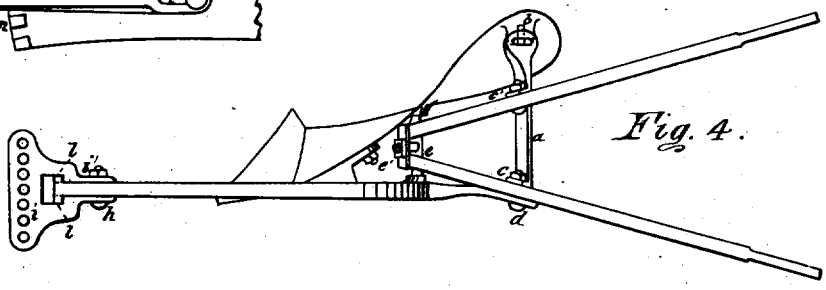

The front edge is spread horizontally, with a row of holes along it, as in Fig. 4, to hitch into for lateral draft and adjustment in the usual way.

Having thus fully described my improvements in plows, I claim and desire to secure by Letters Patent—

1. The adjustable bar *a*, constructed, arranged, and combined with the mold-board and handles as and for the purposes specified.

2. The spreader-rocker *e*, turning in sockets, as described, to which the handles are affixed, substantially as described, and for the purposes specified.

3. The combination of the clevis *i*, having slots *i'* and cogs or lugs *l* thereon, with the end of the beam that has cogs *m* projecting from its sides, so that the cogs *l* enter between the cogs *m*, when the clevis *i* is drawn forward to retain it at the elevation desired.

HARRY WIARD.

Witnesses:
LEVI W. HALL,
J. J. GREENOUGH.